United States Patent
Wilcox et al.

(10) Patent No.: US 10,870,244 B2
(45) Date of Patent: Dec. 22, 2020

(54) METHOD FOR MANUFACTURING LENS WITH FACILITATED LIGHT DIFFUSION

(71) Applicant: IDEAL INDUSTRIES LIGHTING LLC, Durham, NC (US)

(72) Inventors: Kurt Wilcox, Libertyville, IL (US); Craig Raleigh, Burlington, WI (US); Corey Goldstein, Mt. Pleasant, WI (US)

(73) Assignee: IDEAL INDUSTRIES LIGHTING LLC, Durham, NC (US)

( * ) Notice: Subject to any disclaimer, the term of this patent is extended or adjusted under 35 U.S.C. 154(b) by 254 days.

(21) Appl. No.: 15/885,125

(22) Filed: Jan. 31, 2018

(65) Prior Publication Data

US 2018/0156416 A1  Jun. 7, 2018

Related U.S. Application Data

(62) Division of application No. 14/625,712, filed on Feb. 19, 2015, now Pat. No. 9,915,409.

(51) Int. Cl.
| | |
|---|---|
| *F21V 5/08* | (2006.01) |
| *B29D 11/00* | (2006.01) |
| *G02B 19/00* | (2006.01) |
| *G02B 5/02* | (2006.01) |
| *G02B 3/00* | (2006.01) |
| *F21Y 115/10* | (2016.01) |

(52) U.S. Cl.
CPC .. *B29D 11/00798* (2013.01); *B29D 11/00788* (2013.01); *F21V 5/08* (2013.01); *G02B 3/0012* (2013.01); *G02B 3/0031* (2013.01); *G02B 5/021* (2013.01); *G02B 5/0278* (2013.01); *G02B 19/0014* (2013.01); *G02B 19/0028* (2013.01); *G02B 19/0061* (2013.01); *G02B 19/0066* (2013.01); *F21Y 2115/10* (2016.08)

(58) Field of Classification Search
CPC ......... F21V 5/04; F21V 5/08; G02B 19/0061; G02B 3/0031; G02B 5/021; G02B 3/0012; G02B 3/0018; F21Y 2115/10; B29D 11/00009; B29D 11/00355; B29D 11/00798

See application file for complete search history.

(56) References Cited

U.S. PATENT DOCUMENTS 7,991,257 B1 * 8/2011 Coleman ............ B29D 11/0073
264/1.24

* cited by examiner

*Primary Examiner* — Jacob T Minskey
*Assistant Examiner* — Adrien J Bernard
(74) *Attorney, Agent, or Firm* — Coats & Bennett, PLLC

(57) ABSTRACT

A method for manufacturing of a lens for distribution of light from a light emitter. The method provides an injection-molding cavity defined by a shape-forming configuration with a texturing in at least one area of the cavity. A thermoplastic elastomer is injected into the cavity shaping a lens-region thickness of the elastomer. Such lens-region thickness is cooled and set prior to sinking of the elastomer such that the lens-region thickness retains the texturing of the shape-forming configuration forming a textured surface portion of the lens.

18 Claims, 16 Drawing Sheets

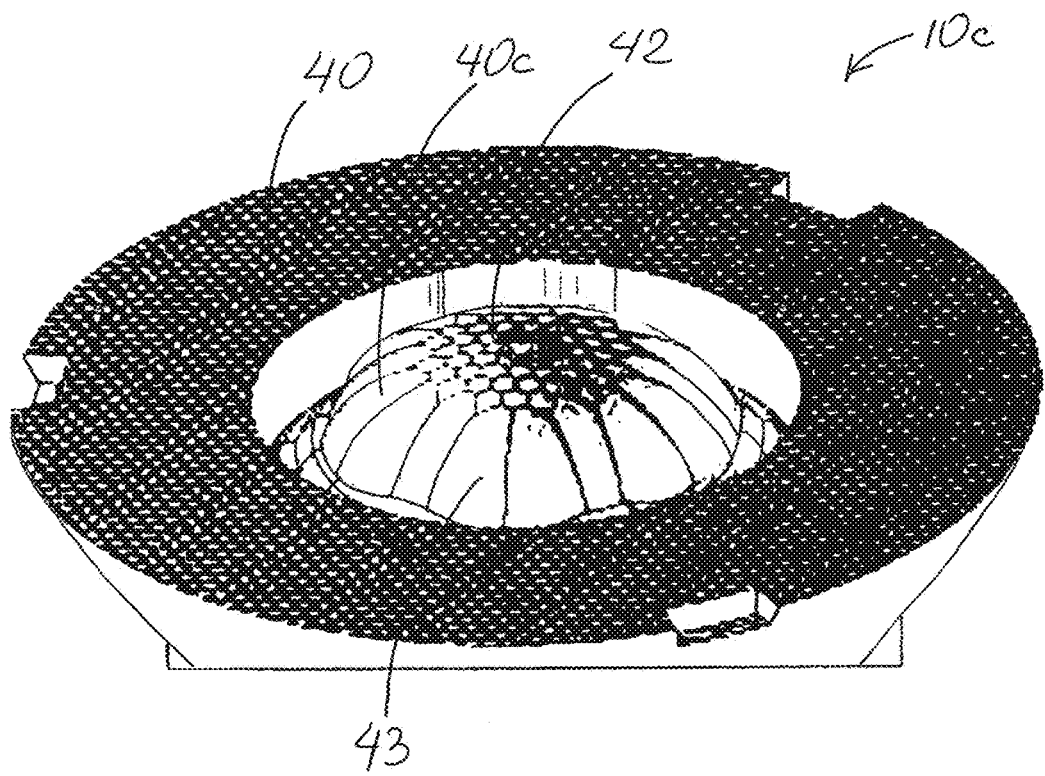
FIG. 8
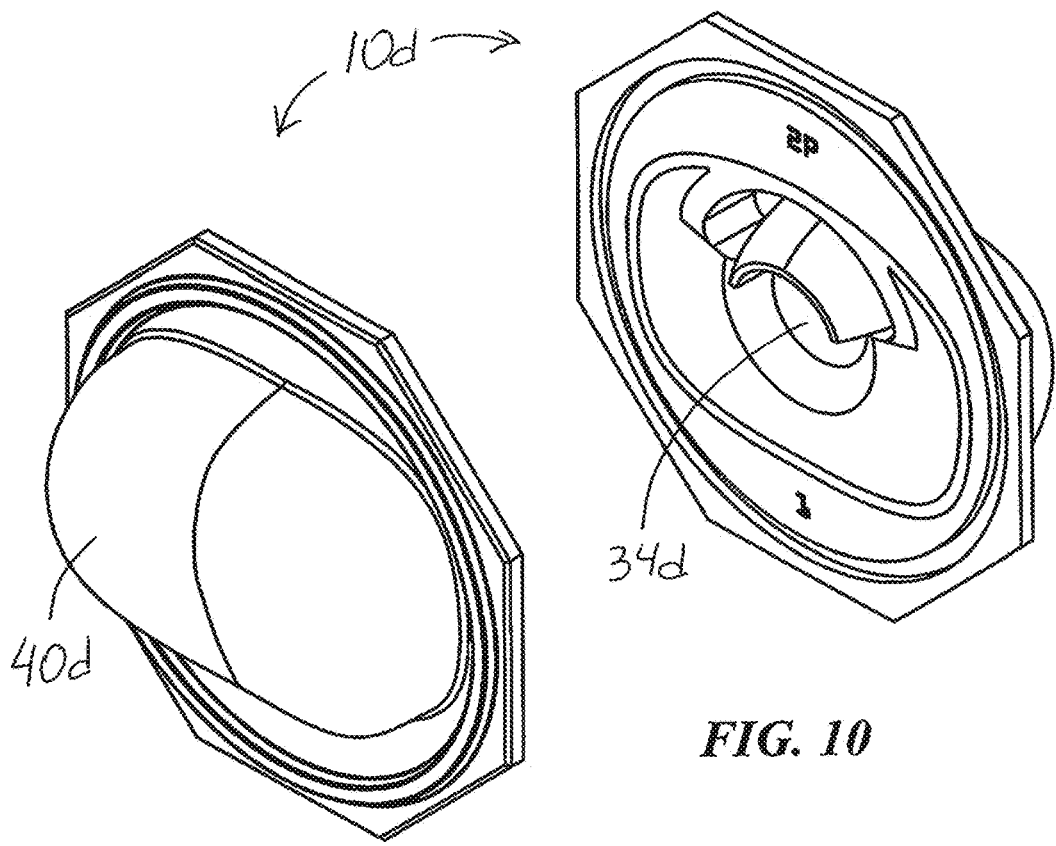
FIG. 9
FIG. 10

METHOD FOR MANUFACTURING LENS WITH FACILITATED LIGHT DIFFUSION

RELATED APPLICATIONS

The present application is a divisional application of patent application Ser. No. 14/625,712, filed on Feb. 19, 2015, which is incorporated herein by reference in its entirety.

FIELD OF THE INVENTION

This invention relates to lighting devices, and more particularly, to LED lighting and to optics designed for desired LED light distribution.

BACKGROUND OF THE INVENTION

In recent years, the use of light-emitting diodes (LEDs) for various common lighting purposes has increased, and this trend has accelerated as advances have been made in LEDs and in LED-array bearing devices. Indeed, lighting needs which have primarily been served by fixtures using high-intensity discharge (HID) lamps, halogen lamps, compact florescent light (CFL) and other light sources are now increasingly beginning to be served by LEDs.

Light emitting diodes (LED or LEDs) are solid state devices that convert electric energy to light, and generally comprise one or more active layers of semiconductor material sandwiched between oppositely doped layers. Light is emitted from the active layer and from all surfaces of the LED. A typical high efficiency LED comprises an LED chip mounted to an LED package and encapsulated by a transparent medium. Many different types of LED die can be used individually or in combination in an LED package based on the package application. Possible die include DA, EZ, GaN, MB, RT, TR, UT, and XT LED die, commercially available from Cree, Inc. The efficient extraction of light from LEDs and the quality of that light are major concerns in LED package fabrication.

Some efforts have been made to develop small lenses for directing light emitted by small LED packages, and utilizing lenses intended to redirect some amount of emitted light to form a desired illumination pattern. However, such lenses have tended to fall short of the most highly desirable performance and uniformity of distribution of the LED-emitted light.

LEDs can be fabricated to emit light in various colors. However, conventional LEDs cannot generate white light from their active layers. In order to achieve white color, light from a blue emitting LED has been most commonly converted to white light by surrounding the LED with a yellow phosphor. The surrounding phosphor material "downconverts" the energy of some of the LED's blue light which increases the wavelength of the light, changing its color to yellow. While in such arrangements a large portion of the light is downconverted to yellow, some of the blue light still passes through the phosphor without being changed such that the resulting LED light has a cold-blue white color.

There have been efforts to manufacture white light which resembles the warm-yellow white color of light produced by the common non-LED light sources. Certain methods involve the use of LED packages including dies producing light of different colors which are mixed together to achieve the desirable yellow-white. Such methods require effective mixing of different color light, as well as efficient distribution of such light.

It would be highly beneficial to provide a lighting apparatus which produces a desired illumination with uniform distribution of the intended-color light.

SUMMARY OF THE INVENTION

One aspect of this invention is an improved lens for distribution of light from a light emitter which has an axis. The lens includes thick and thin wall portions between inner and outer lens surfaces, the thick wall portion(s) being at least twice as thick as the thin wall portion(s). In certain embodiments, an area of at least one of the inner and outer surfaces has texturing for diffusion of emitter light passing therethrough. The lens is of a molded thermoplastic elastomer.

In certain embodiments, the inner lens surface includes a textured inner surface portion. The inner surface may define an inner cavity receiving light from the light emitter. In some of such embodiments, the textured inner surface portion defines an innermost region of the inner cavity.

The textured inner surface portion may be positioned on the emitter axis for diffusion of axial emitter light. The thin wall region(s) may include(s) the emitter axis and may be between the textured inner surface portion and the outer surface. The innermost region of the cavity may be substantially conical with the vertex on the emitter axis.

In some embodiments, the outer lens surface includes a textured surface portion for diffusion of the light received from the inner surface. The textured outer surface portion may be positioned on the emitter axis to further diffuse axial emitter light.

The lens may be substantially rotationally symmetrical about the emitter axis.

In certain embodiments, the lens includes at least one interface between two materials with different indices of refraction, at least one surface of the interface having texturing for diffusion of emitter light passing therethrough. The texturing may be on a light-receiving surface of the at least one interface. In certain embodiments, the texturing may be on the light-output surface of the interface.

Another aspect of the present invention is a method for manufacturing of a lens for distribution of light from a light emitter. In certain embodiments of the inventive method, an injection-molding cavity is provided. The cavity is defined by a shape-forming configuration which includes a surface portion with texturing. A lens region with a textured surface portion is molded by injecting a thermoplastic elastomer into the cavity which is configured to form a wall of such thickness that the set elastomer retains the texturing.

In some embodiments, the lens region with the textured surface portion is a first-formed lens region. The textured surface portion may be of a light-entrance surface of the lens.

The method may include the step of at least partially over-molding a lens region formed in the preceding injection-molding shot. Certain versions of the inventive method include the step of over-molding the first-formed lens region at surface portion(s) other than the textured surface portion.

The lens region with the textured surface portion may be a last-formed lens region. The textured surface portion may be of a light-output surface of the lens. The last-formed lens region may be formed by at least partially over-molding a lens region formed in the preceding injection-molding shot.

In certain embodiments, each subsequent injection-molding shot is prior to full cooling of the lens region formed in the previous shot. This results in the overmolding being substantially seamless.

The method may further include the step of forming a second textured surface portion by over-molding a lens region formed in the preceding injection-molding shot. The forming step is performed by injecting the thermoplastic elastomer into a cavity defined by a shape-forming configuration which includes a surface portion with texturing and is configured to form a wall of such thickness that the set elastomer retains the texturing.

The lens region with the second textured surface portion may be a last-formed lens region. The lens region with the second textured surface portion may be of a light-output surface of the lens.

The method may further include the step of forming an interface between two materials with different indices of refraction. At least one surface of the interface may have texturing for diffusion of emitter light passing therethrough. Such step may be by overlaying the textured surface portion with a second thermoplastic elastomer.

As used herein, the term "texturing" with reference to a lens surface or a portion thereof means a micro-shape random surface roughness which causes diffusion (scattering) of light by random refraction rather than causing particular directionality. Texturing provides translucency to the surface. It should be noted that the macro shape even of a textured surface may still impose general directionality to the diffused light passing through such translucent surface.

As used herein, the degree of texturing is sometimes referred to by reference to the depth of the micro-shape random surface roughness using Mold-Tech® texture standards given in microns of depth. Examples of the texturing include textures referenced in the Mold-Tech® standards as MT-11000 which is 10µ deep, MT-11010 which is 25µ deep, MT-11030 which is 50µ deep, MT-11040 which is 75µ deep, MT-11050 which is 110µ deep and MT-11100 which is 150µ deep. Many other textures of various depths may be used within the scope of the present invention.

BRIEF DESCRIPTION OF THE DRAWINGS

FIG. 8 is a fragmentary perspective view of yet another embodiment of a lens according to the present invention.

FIG. 9 is an opaque perspective view of light-output surfaces of still another embodiment of a lens according to the present invention.

FIG. 10 is a perspective view of light-receiving surfaces of the lens of FIG. 9.

DETAILED DESCRIPTION OF EXEMPLARY EMBODIMENTS

Figure 14:
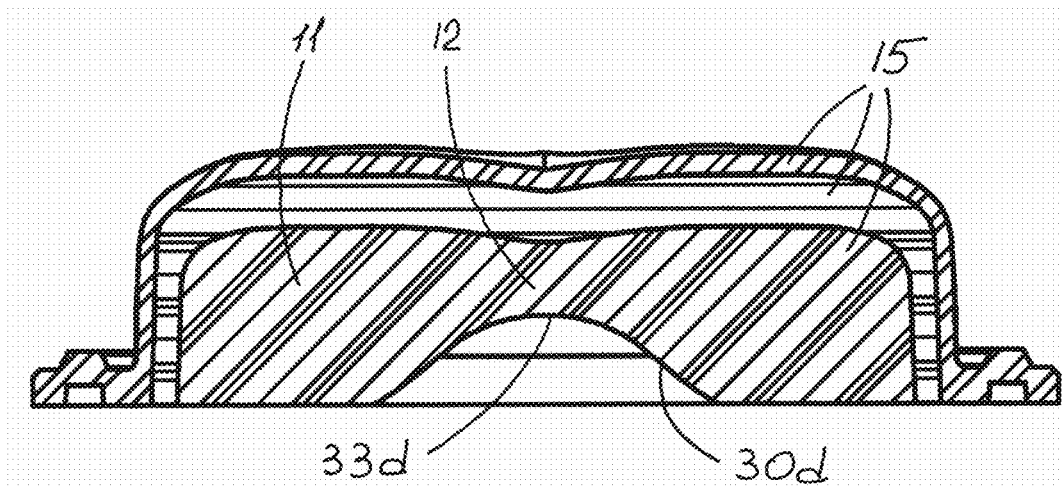
FIG. 14 is a sectional view taken along section 14-14 as indicated in FIG. 13.

The Figures illustrate exemplary embodiments of lens 10 for distribution of light from a light emitter 20 which has an axis 21. Lens 10 includes thick wall portions 11 and thin wall portions 12 which are between inner lens surface 30 and outer lens surface 40. It is best seen in FIGS. 4, 6 and 14 that thick wall portion(s) 11 may being at least twice as thick as thin wall portion(s) 12.

FIGS. 1-7 illustrate lenses 10a and 10b with an area of inner surface 30 having texturing 32 for diffusion of emitter light passing therethrough. FIG. 8 shows an example of lens 10c with an area of outer surface 40 having texturing 42 for diffusion of emitter light passing therethrough. Depending on application, there may be lenses with both inner and outer lens surfaces having textured areas for diffusion of emitter light passing through such areas.

FIGS. 1-5 show that in lenses 10a and 10b, inner surface 30 defines an inner cavity 34 receiving light from light emitter 20. It is best seen in FIGS. 1 and 4-7 that textured inner surface portion 33 defines an innermost region 35 of inner cavity 34. FIGS. 4-7 further show textured inner surface portions 33a and 33b positioned on emitter axis 21 for diffusion of axial emitter light.

Figure 1:
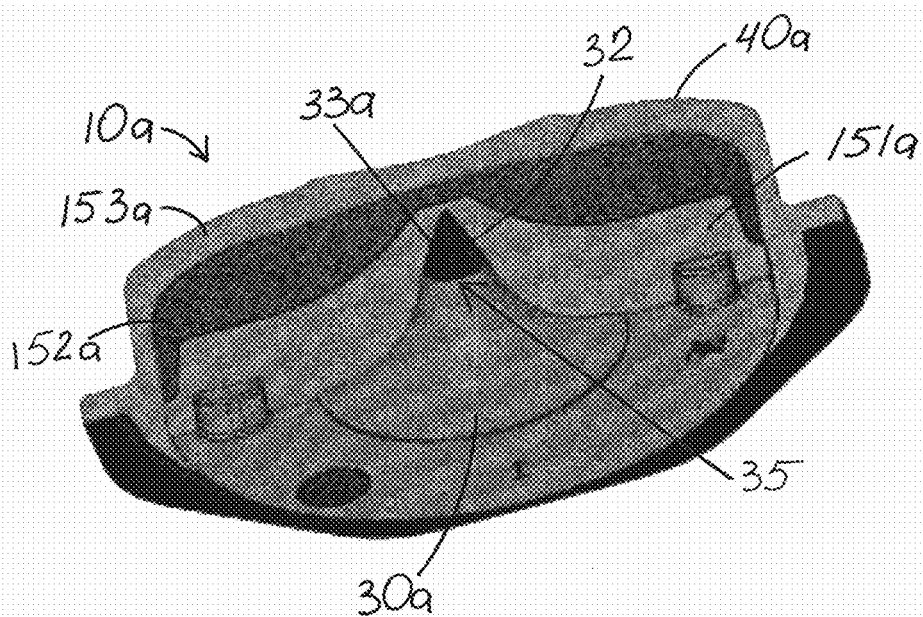
FIG. 1 is an enlarged perspective cross-sectional view of the inventive lens illustrating texturing on the innermost region of the inner cavity.
Figure 2:
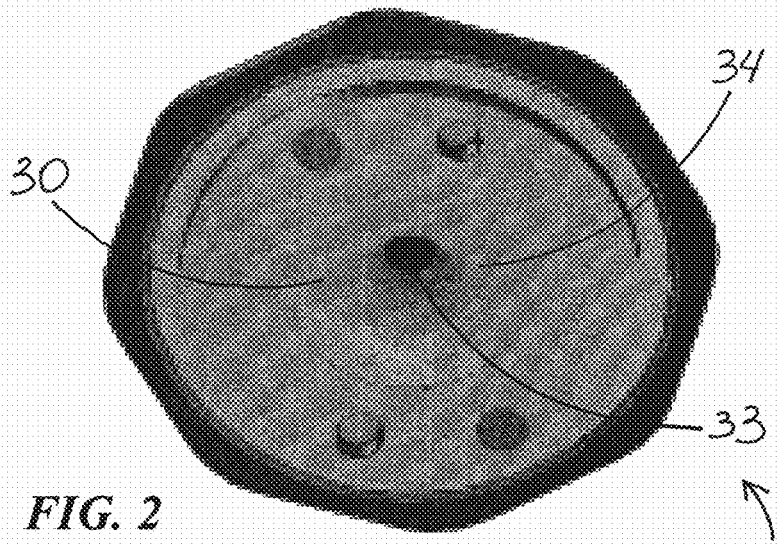
FIG. 2 is an enlarged perspective view of light-receiving inner surfaces of the lens of FIG. 1.
Figure 3:
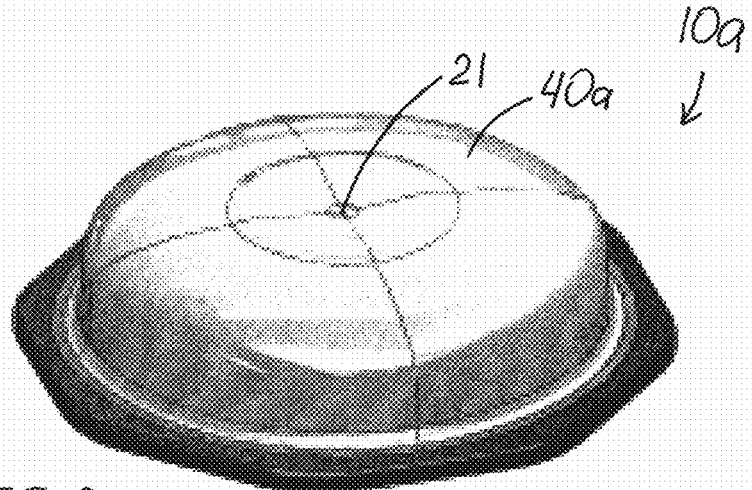
FIG. 3 is an enlarged opaque perspective view of light-output outer surfaces of the lens of FIG. 1.
Figure 4:
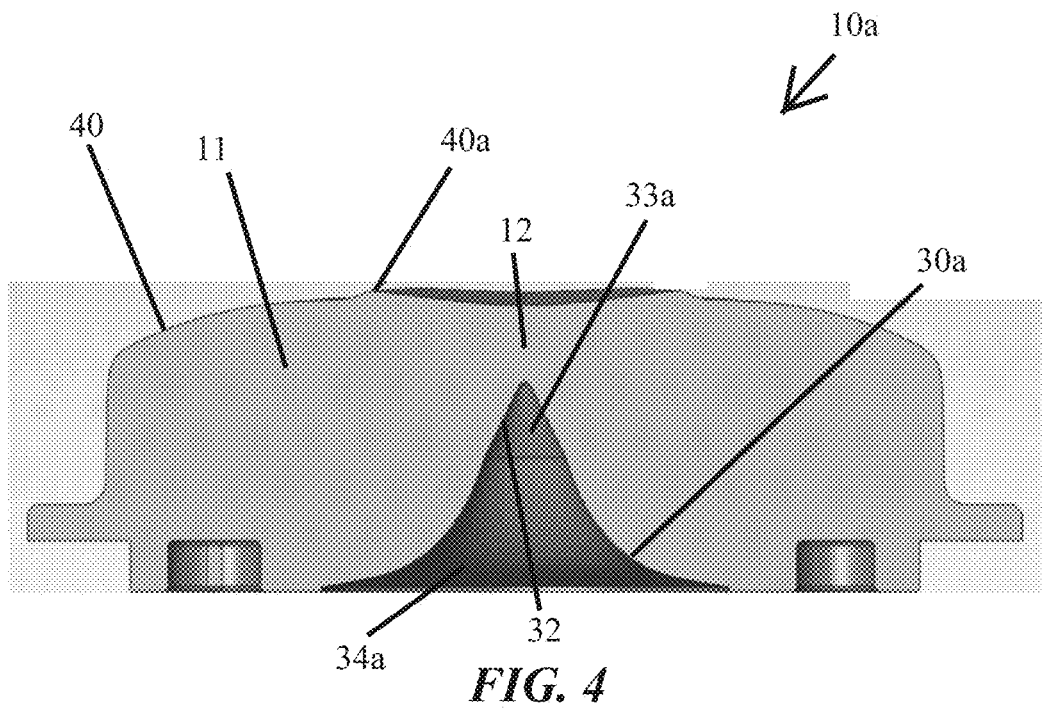
FIG. 4 is an enlarged cross-sectional side view of the lens of FIG. 1.
Figure 6:
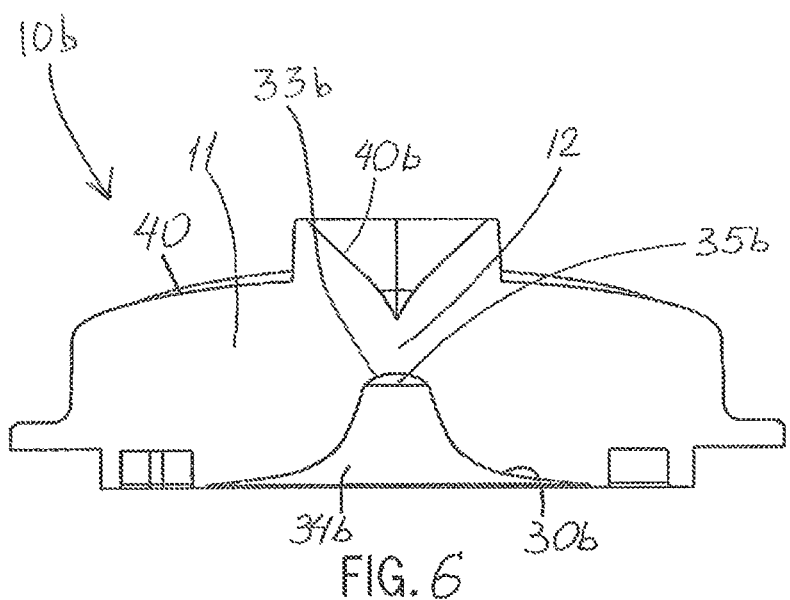
FIG. 6 is an enlarged cross-sectional side view of another embodiment of a lens according to the present invention.

FIGS. 1, 4 and 6 show thin wall region 12 to include emitter axis 21. Thin wall region(s) 12 is/are shown between textured inner surface portion 33 and outer surface 40.

In lens 10a seen in FIGS. 1-5, innermost region 35a of cavity 34a is shown substantially conical with the vertex on emitter axis 21.

Figure 7A:
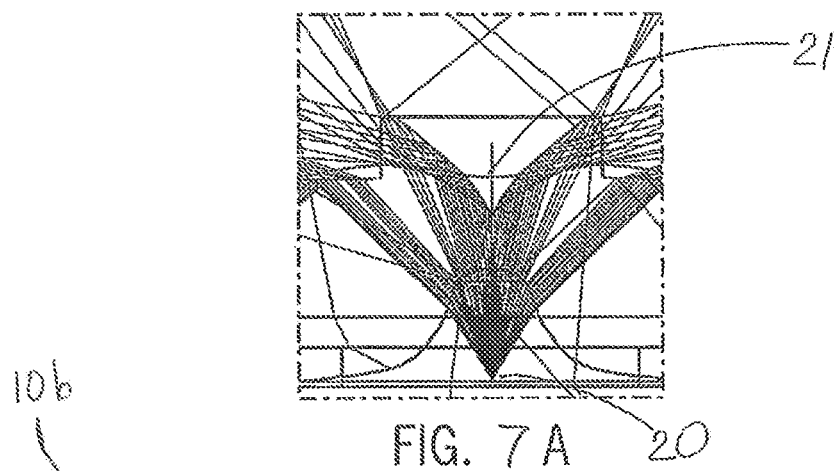
FIG. 7A is an enlarged fragment of FIG. 7 showing the path of light through the lens about the axis.
Figure 7:
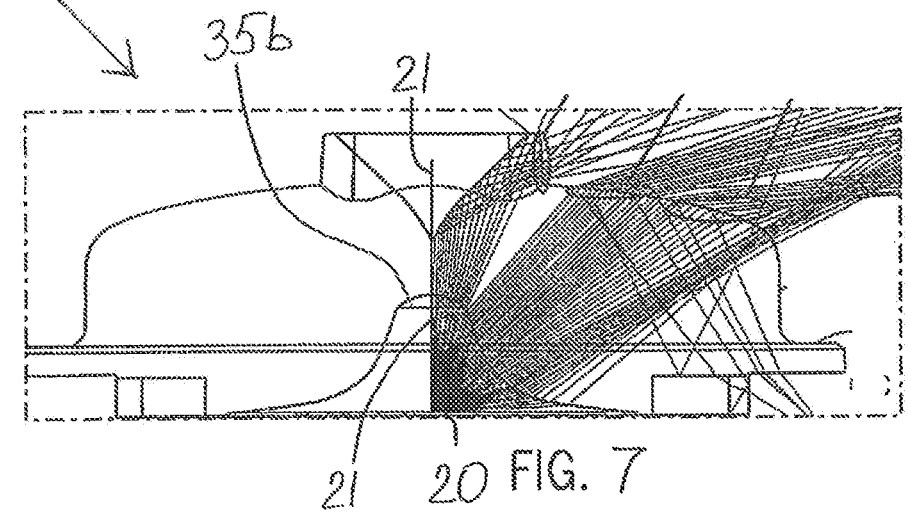
FIG. 7 is an enlarged side view of the lens of FIG. 6 schematically showing light direction through the lens.
Figure 11:
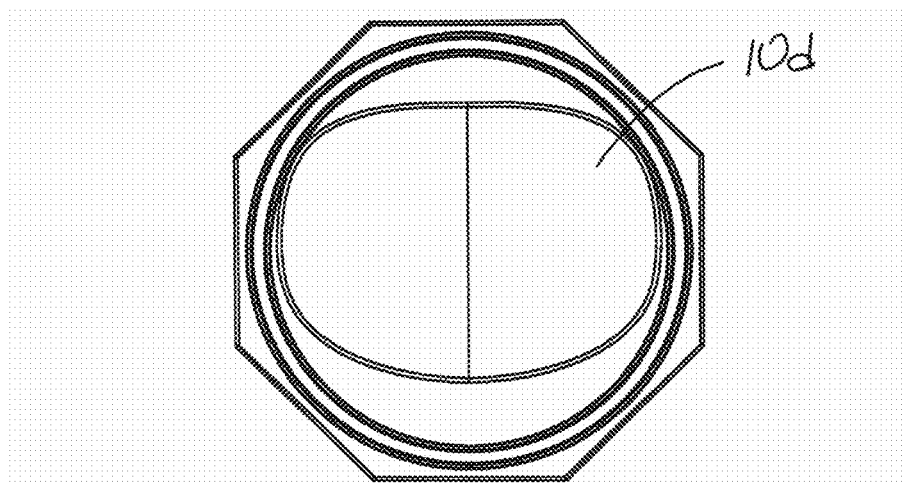
FIG. 11 is a plan view of the light-output surfaces of the lens of FIG. 9.
Figure 12:
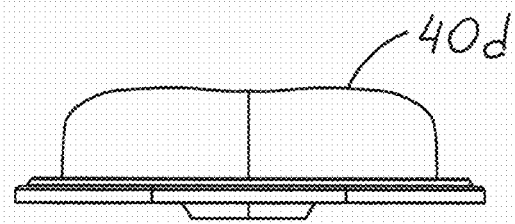
FIG. 12 is a side elevation of the lens of FIG. 9.
Figure 13:
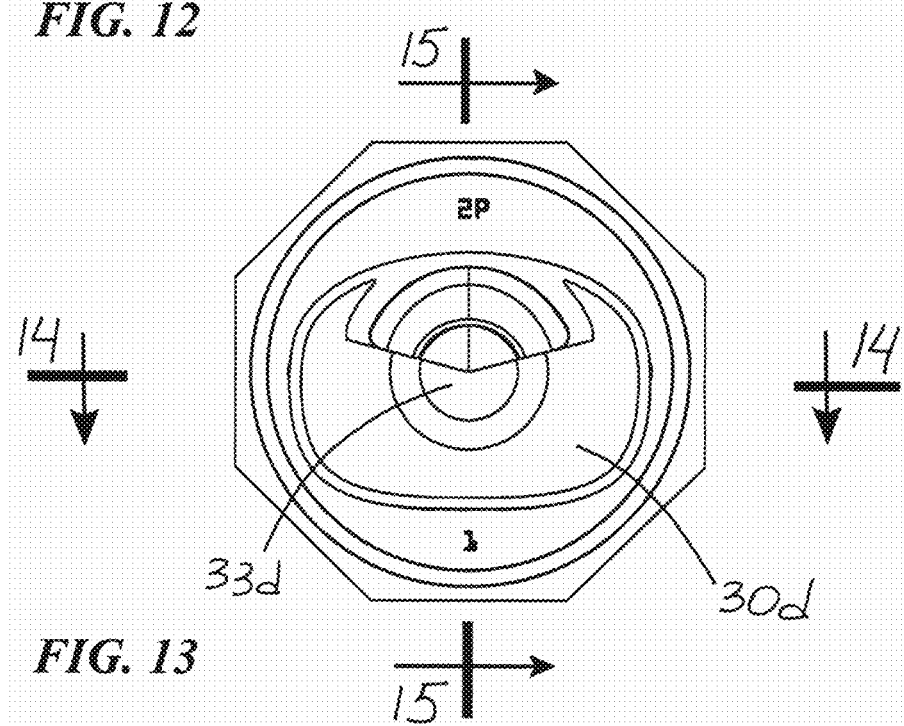
FIG. 13 is a plan view of the light-receiving surfaces of the lens of FIG. 9.

In lens 10b seen in FIGS. 6-7, innermost region 35b of cavity 34b is shown as having a dome shape, the axis of the dome being on emitter axis 21.

FIG. 8 shows lens 10c with outer lens surface 40c including a textured surface portion 43 for diffusion of the light received from inner surface 30. In FIG. 8, textured outer surface portion 43 is shown positioned on the emitter axis to diffuse axial emitter light. In particular, lens 10c includes a set of facets on exit geometry to facilitate color mixing, diffusion and light-beam shaping.

Lenses 10a, 10b and 10c seen in FIGS. 1-8 are substantially rotationally symmetrical about emitter axis 21. FIGS. 9-17A illustrate asymmetrical lenses 10d and 10e for preferential-side light distribution.

For thick-walled optics, a molding process known as "injection compression" is often used to improve dimensional replication. However, texture is difficult to add to a particular surface as the compression cycle normally begins after the resin has started to set up. In a one-step injection molding process for forming a thick-walled optics, cooling and setting of the total thickness of a thermoplastic material takes such a length of time that any attempt at texturing is deformed or totally disappears due to sinking of the material. In some examples of one-step injection molding process for forming thick-walled optics, cooling and setting may take somewhere between six and ten minutes. In order to add texture to a thick-walled optic formed in the one-step injection molding, the process requires addition of complex variotherm equipment and sometimes conformal cooling channels.

In contrast, by building the lens in regions (multi-layer molding), the portion of the lens with texture can be molded without sinking and results in satisfactory reproduction of the texture's structure. In such multi-layer molding processes, the texturing may be formed on a lens region of such thickness of thermoplastic material which cools and sets prior to sinking of the material. Due to the rapid cooling and setting, the material retains the texturing on its surface. Therefore, a standard process known as "pack and hold" can be used which provides easier processing and less capital equipment, including a reduced cost of molds than those needed in adding texture to a thick-walled optic formed by the one-step injection molding. The multi-layer molding provides shorter cycle times, improved optical control and improved optical efficiency. In some examples of multi-layer molding process for forming thick-walled optics, cooling and setting of a lens region with surface texturing may take at little as forty seconds.

FIGS. 1 and 14-17A show lenses 10a, 10d and 10c formed by molding multiple regions 15, including regions 151, 152 and 153.

An exemplary multi-layer molding cycle for the first injection-molding shot forming region 151a of lens 10a is 76.5 seconds with 24 seconds of cooling.

FIGS. 1 and 14-16 show regions 151a and 151d each as a first-formed lens region which includes respective inner lens surface 30a and 30d of lens 10a and 10d, respectively. FIG. 1 also shows that, inner and outer surfaces 30a and 40a are respectively formed with first-formed lens region 151a and last-formed lens region 153a of lens 10a.

Figure 15:
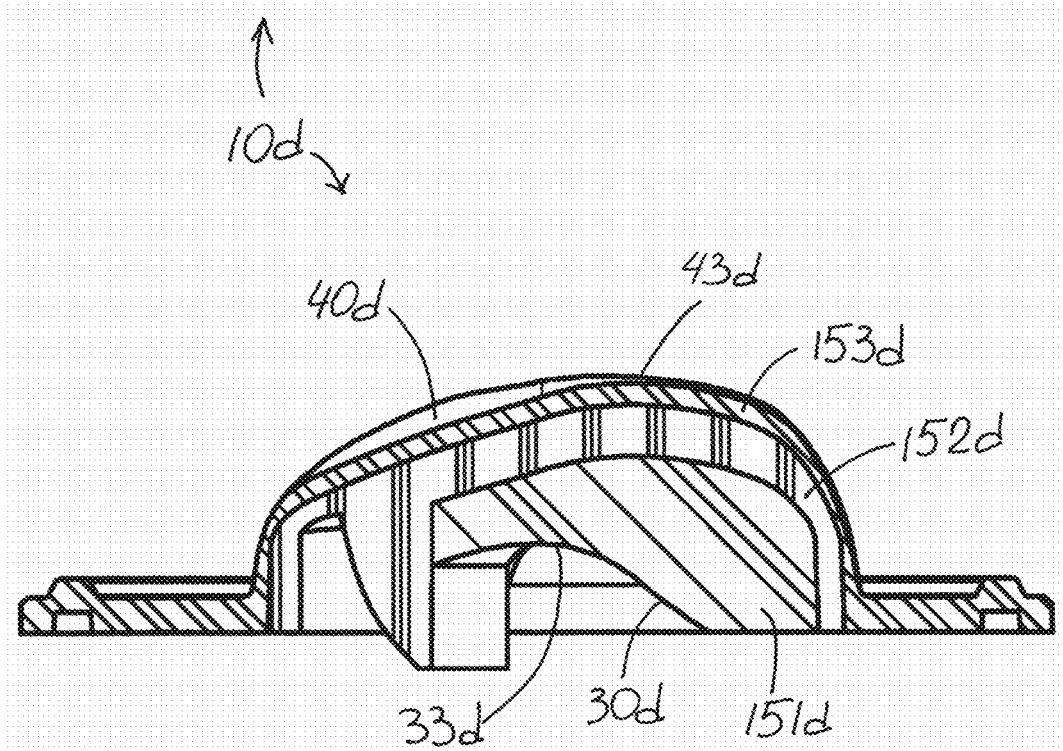
FIG. 15 is a sectional view taken along section 15-15 as indicated in FIG. 13.

FIG. 15 shows that at least a portion of one of inner and outer surfaces 30d and 40d of lens 10d is formed with at least one of regions 151d, 152d and 153d molded in a corresponding injection-molding shot.

Figure 28:
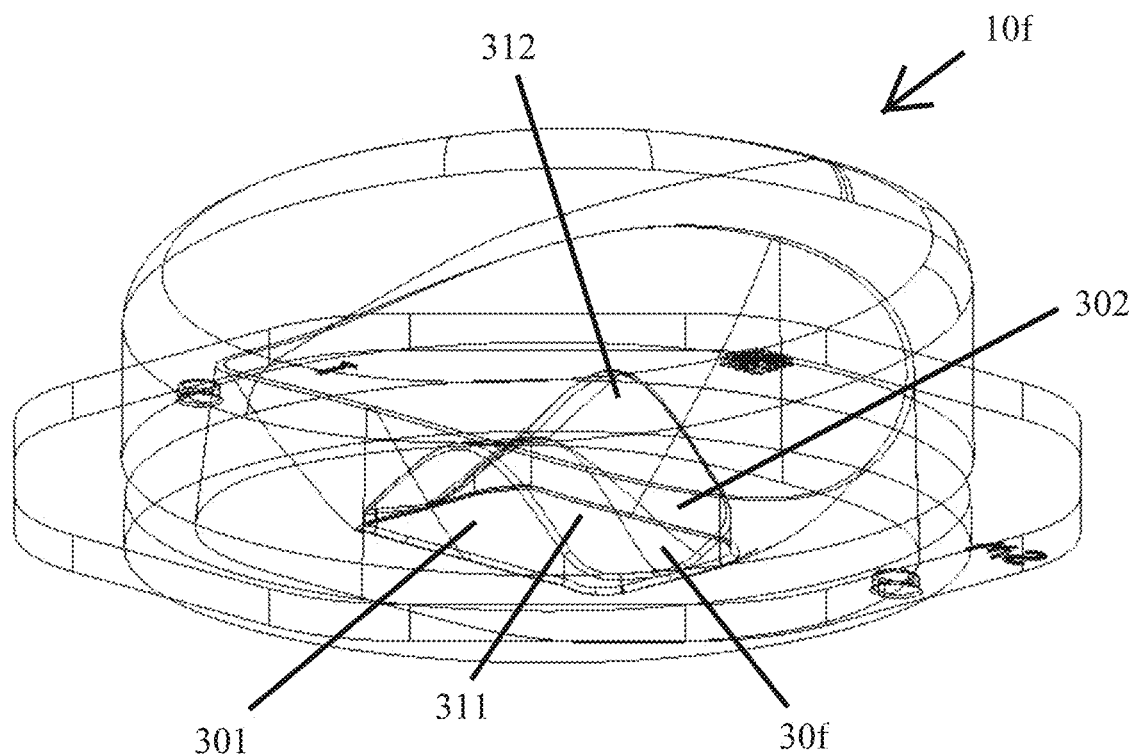
FIG. 28 is a transparent perspective view of another example of a lens according to the present invention.
Figure 29:
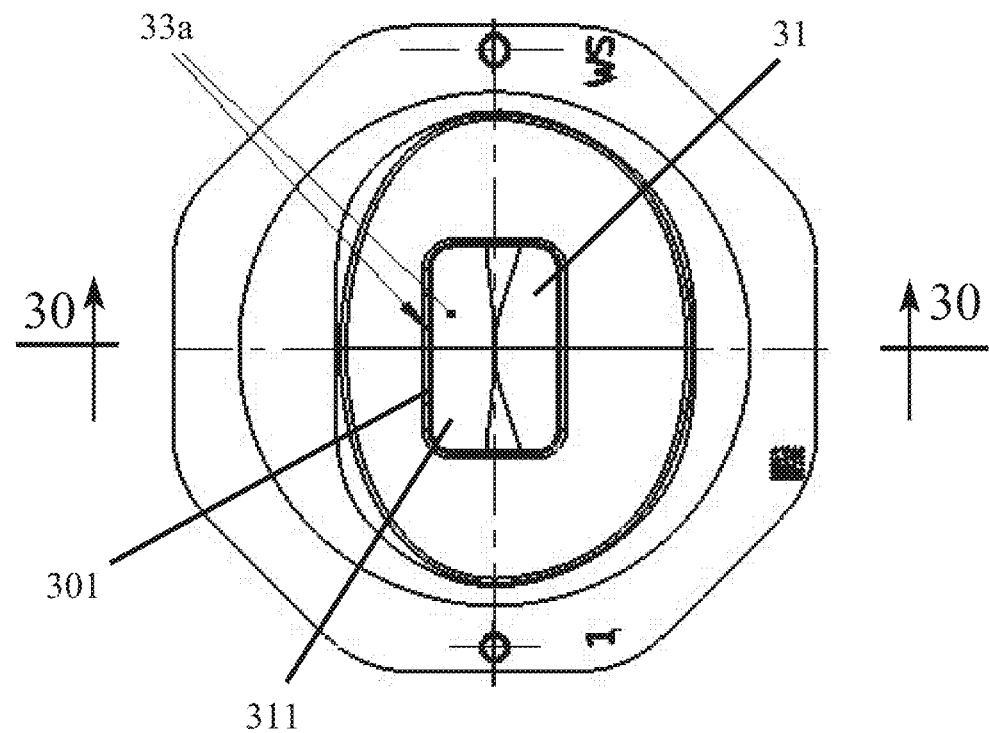
FIG. 29 is a plan view of the light-receiving surfaces of the lens of FIG. 28.
Figure 30:
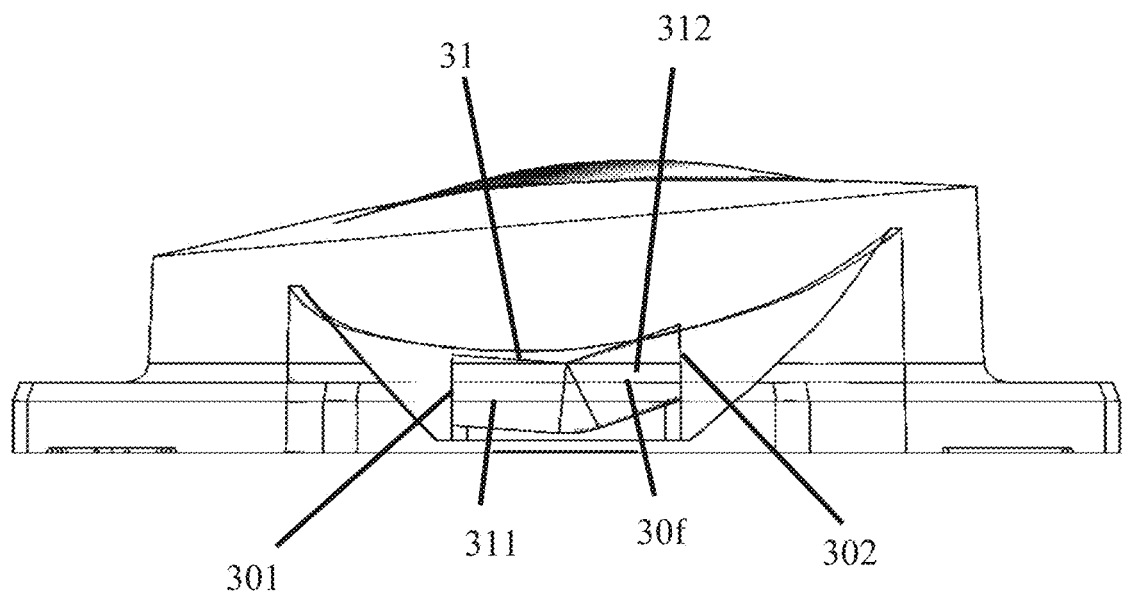
FIG. 30 is a sectional view taken along section 30-30 as indicated in FIG. 29.
Figure 31:
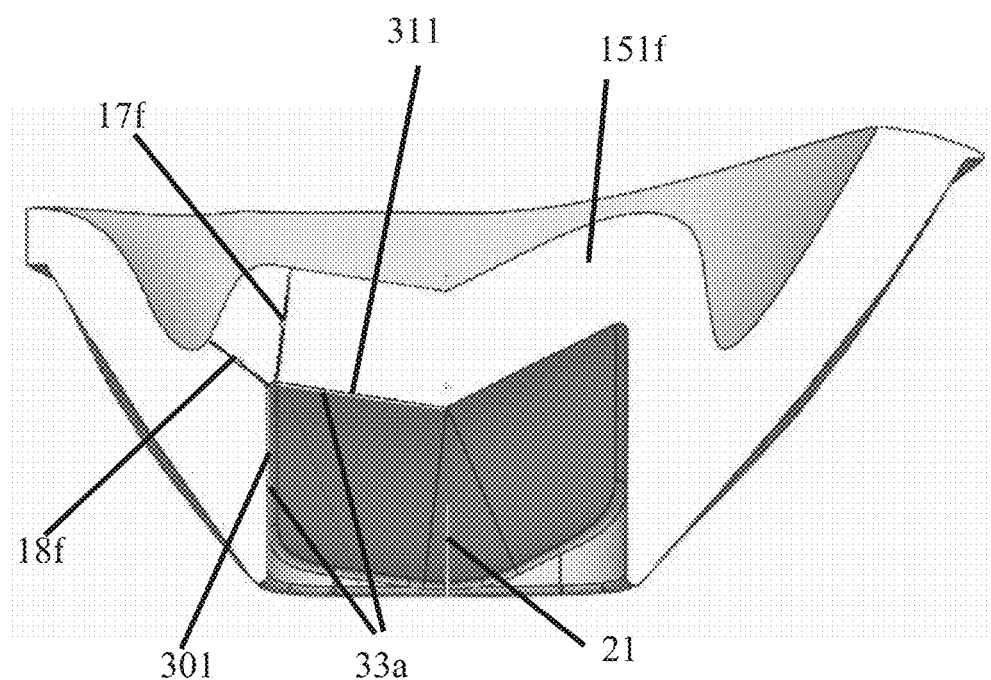
FIG. 31 is an enlarged cross-sectional view of a first-formed lens region including a textured inner-surface portion of the lens of FIG. 28.

FIGS. 28-31 illustrate yet another example of a lens 10f configured for primarily forward light distribution. It is best seen in FIG. 28-30 that an inner surface 30f includes substantially planar front and back surface portions 301 and 302 and an end surface portion 31 which includes front and back segments 311 and 312, each extending inwardly from the respective front and back surface portions 301 and 302. Lens 10f has texturing on front surface portion 301 and front segment 311 of end surface portion, as seen in FIG. 31. FIG. 31 also shows that inner surfaces 30f of lens 10f is formed with region 151f molded in a corresponding injection-molding shot.

It should be understood that it is within the scope of the present invention to have outer light-output lens surfaces formed first and inner light-receiving lens surfaces formed last. The present invention is not limited to the order of forming lens regions which include particular lens surfaces.

FIGS. 18-25 illustrate examples of injection-molding apparatus 50A and 50B. Injection-molding apparatuses of this type are described in detail in application Ser. No. 14/508,915, filed on Oct. 7, 2014, which contents are incorporated herein by reference in their entirety.

Figure 20:
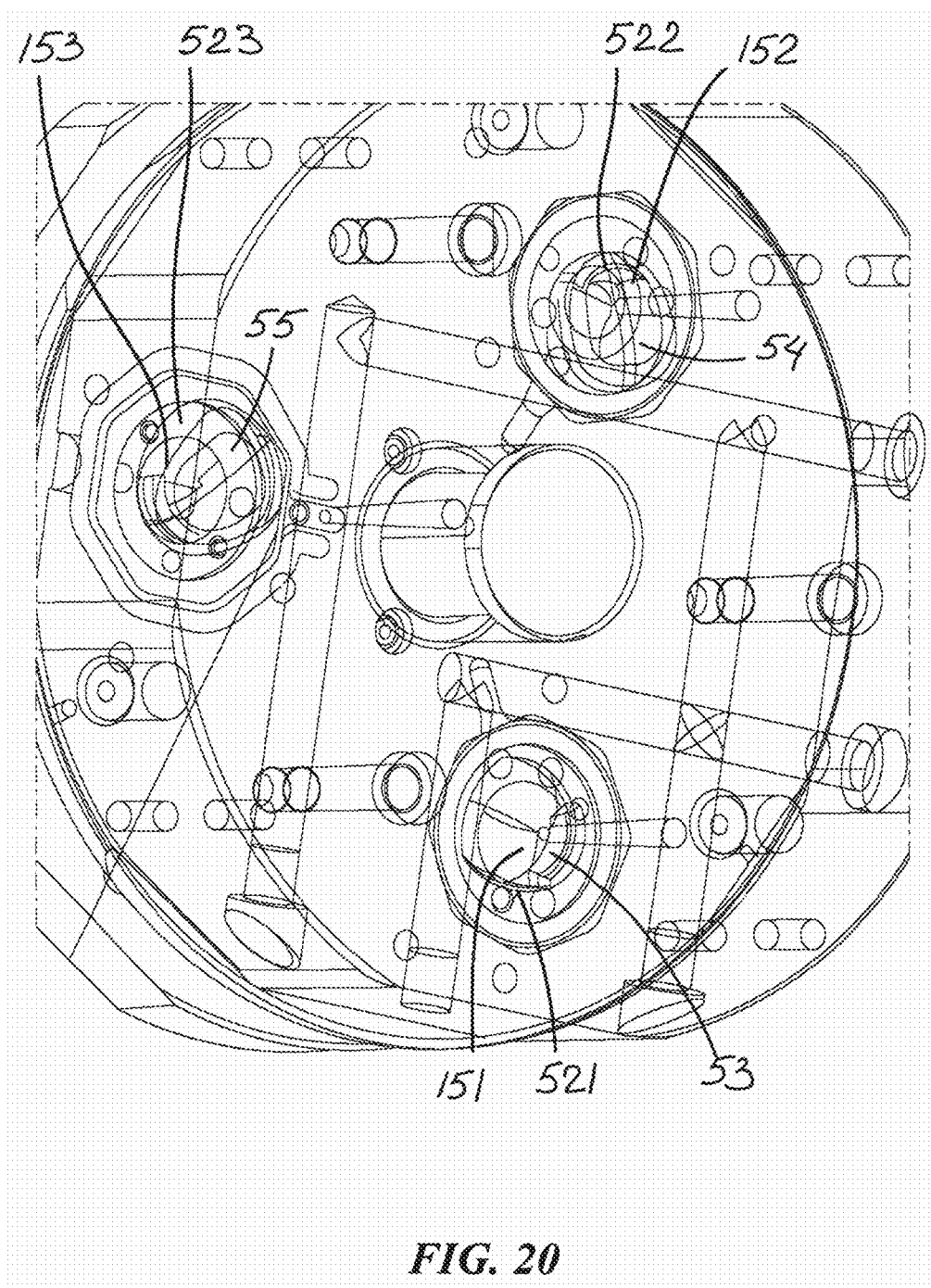
FIG. 20 is a schematic transparent view of the injection-molding apparatus illustrating cavities of FIGS. 18 and 19 paired together and showing nozzles delivering an injection-molding shot to each of the pairs.
Figure 21:
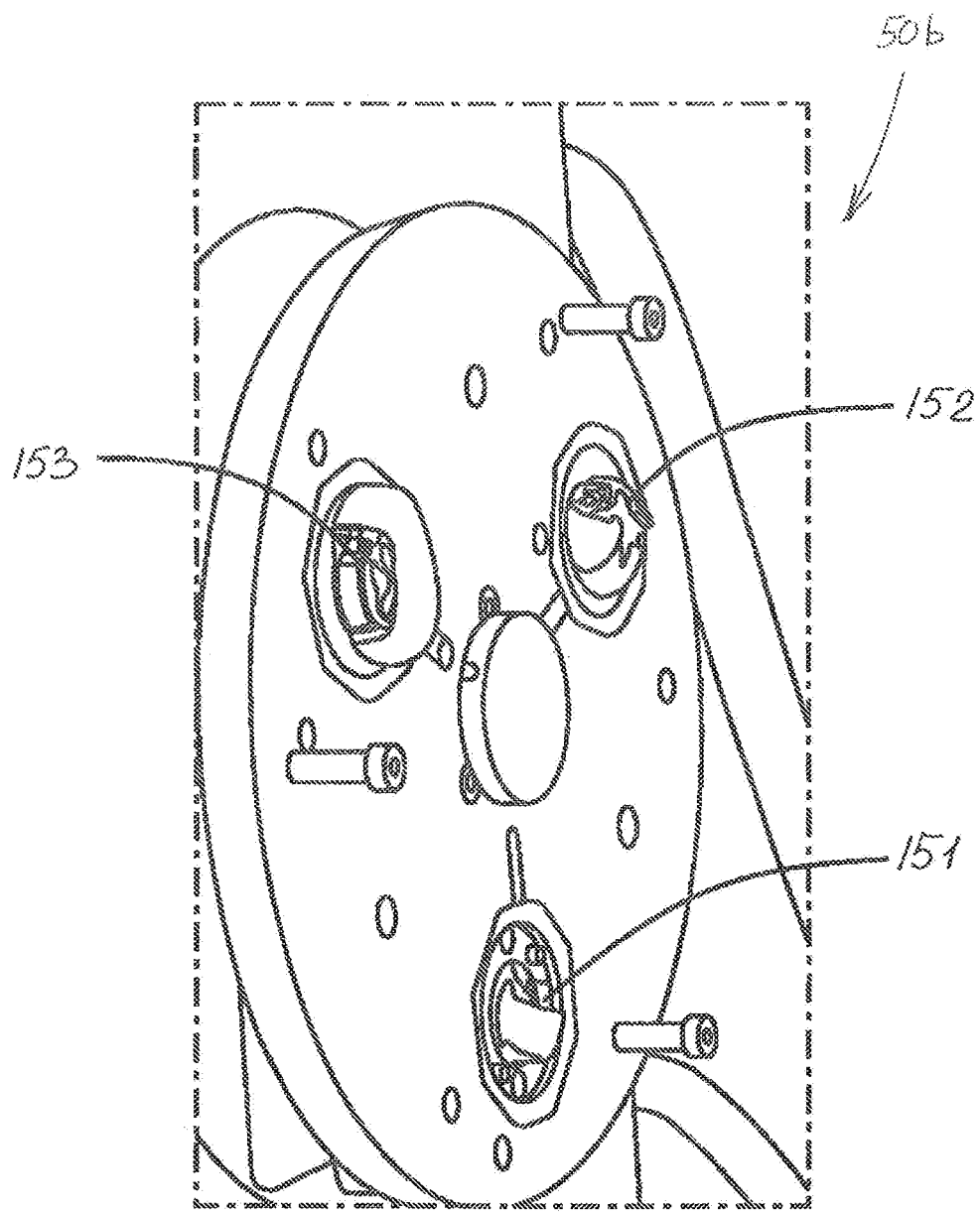
FIG. 21 is a partial view of the injection-molding apparatus as in FIGS. 18 and 19, but showing three lens regions, each formed in the corresponding cavity by the preceding injection-molding shot(s).

FIGS. 20 and 21 best illustrate three lens regions 151d, 152d and 153d each formed by the preceding injection-molding shot(s) in a corresponding cavity 52 of injection-molding apparatus 50A.

Region 151d is formed in an injection-molding cavity 521 defined by a shape-forming configuration 53 which includes texturing in at least one area of cavity 521. Shape-forming configuration 53 is configured to shape an injected thermoplastic elastomer into such thickness that the set elastomer retains the texturing (see in FIGS. 14-16).

Figure 16:
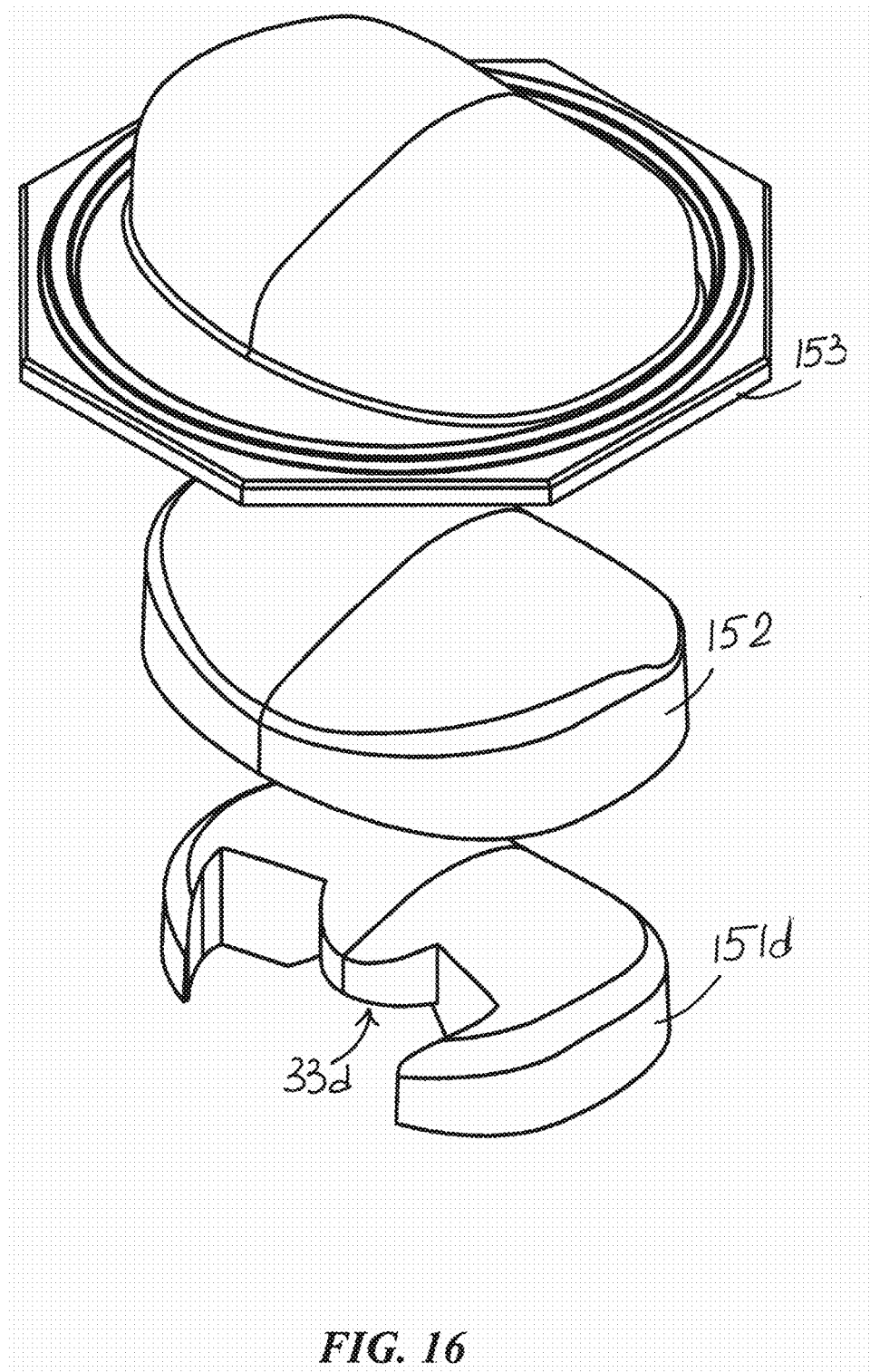
FIG. 16 is an enlarged exploded perspective view of the lens of FIG. 9 schematically showing lens regions formed in each injection-molding shot.

FIGS. 16 and 21 show lens region 151d with textured surface portion 33 as a first-formed lens region. It is seen in FIGS. 14 and 15 that textured surface portion 33d is of inner light-entrance surface 30 of lens 10d. For lens 10a, FIG. 1 shows that textured surface portion 33a is of inner light-entrance surface 30a.

FIGS. 1, 14, 15 and 20 show lens region(s) 151 and/or 152 formed in the preceding injection-molding shot is/are at least partially over-molded by subsequently-formed lens regions 152 and/or 153. FIGS. 1, 14 and 15 show that first-formed lens region 151 is over-molded at surface portion(s) other than the textured surface portion 33.

FIGS. 14 and 15 also show textured surface portion 43 of light-output surface 40 as last-formed lens region 153. It is best seen in FIGS. 14 and 15 that last-formed lens region 153d is formed by partially over-molding lens region 152 formed in the preceding injection-molding shot.

Textured surface portion 43 of outer surface 40 is formed during molding of last-formed lens region 153. Region 153 is molded by injecting the thermoplastic elastomer into cavity 523 which retains the prior-formed lens region(s), as seen in FIG. 20. Cavity 523 is defined by a shape-forming configuration 55 with a second texturing in a second area of cavity 52. Shape-forming configuration 55 is configured to shape the thermoplastic elastomer into such thickness that the set elastomer retains the second texturing.

Figure 18:
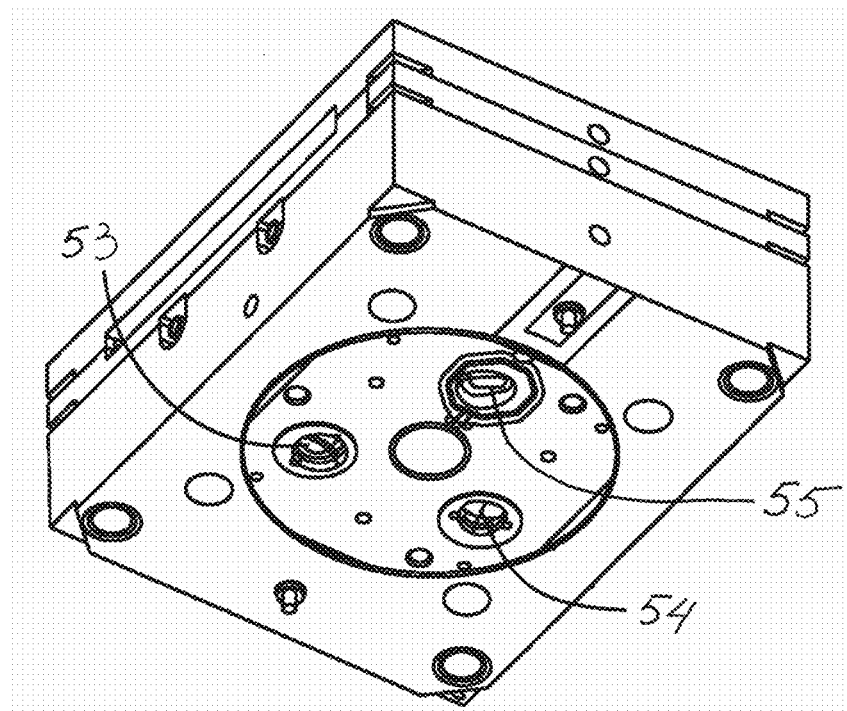
FIGS. 18 and 19 are perspective views of portions of an exemplary injection-molding apparatus which has three sets of shape-forming configurations in the form of cavities, each of which is shaped according to a corresponding one of three lens regions.
Figure 19:
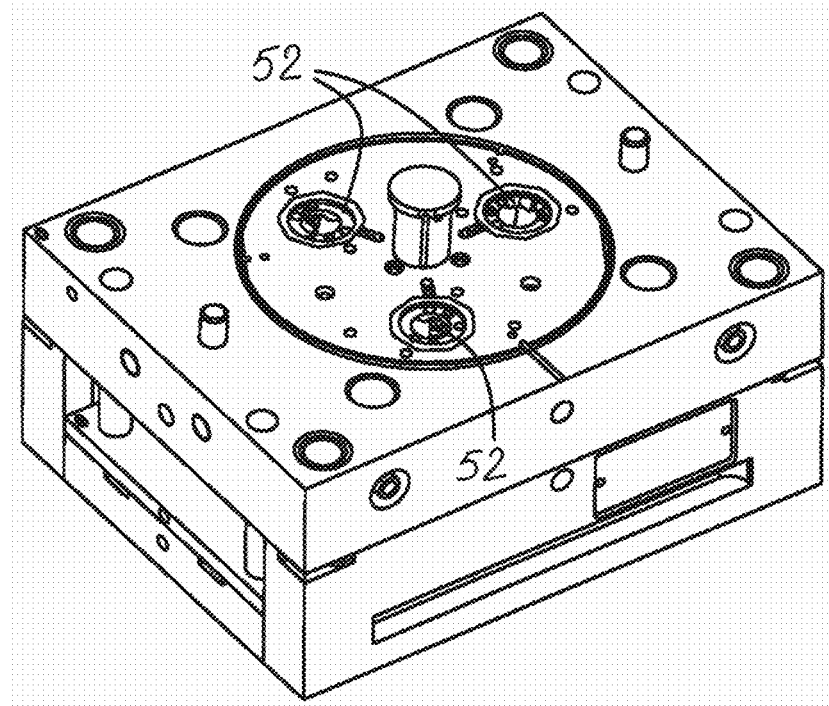

FIGS. 18 and 20 show that cavity 522 is defined by a shape-forming configuration 54 for molding an intermediate second-formed lens region 152.

Figure 5:
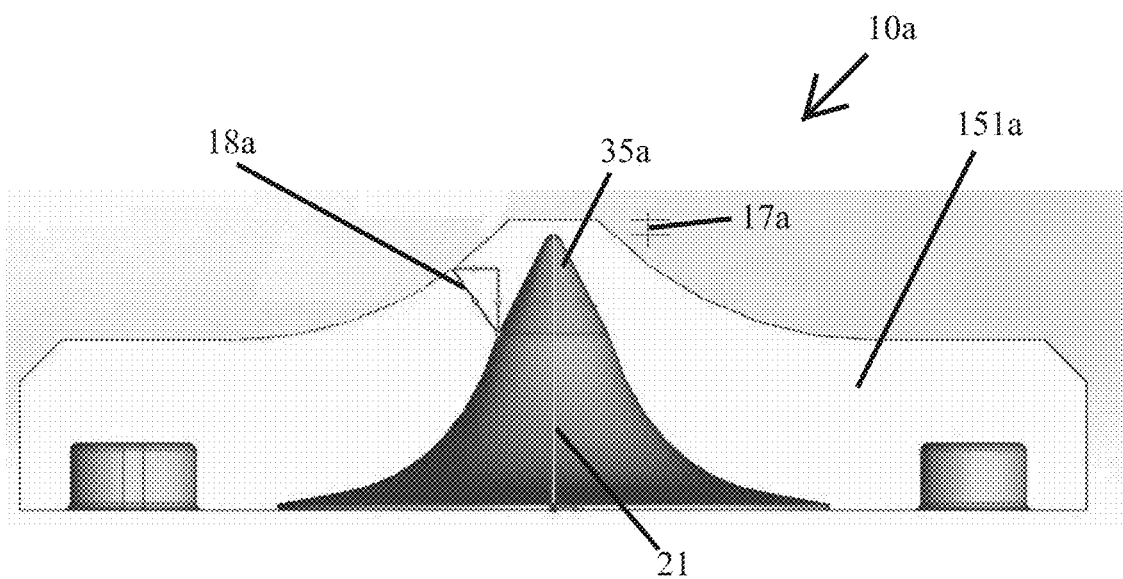
FIG. 5 is an enlarged cross-sectional side view of a first-formed lens region including a textured inner-surface portion of the lens of FIG. 1.

FIGS. 5 and 31 illustrate examples of regions 151a and 151f of lenses 10a and 10f, respectively. FIG. 5 shows that exemplary region 151a has a thickness 17a of 0.55 mm (0.022 in) measured on axis 21 and a thickness 18a of 2.98 mm (0.117 in) laterally about the textured surface portion 33a. As seen in FIG. 5, thickness 18a is measured at the hypotenuse of the right triangle which has one leg that intersects the juncture of textured surface portion 33a and the adjacent non-textured surface, such intersection being at the point at which the hypotenuse is substantially normal/perpendicular to a surface of the corresponding shape-forming configuration which forms region 151a. (The legs of such right triangle have lengths of 2.43 mm (0.096 in) parallel to axis 21 and 1.73 mm (0.068 in) orthogonal thereto.)

FIG. 31 shows that exemplary region 151f has a thickness 17f of 3.10 mm (0.122 in) measured in a direction substantially along axis 21 and a thickness 18f of 2.11 mm (0.0831 in) laterally about the textured surface portion 33a.

The injection-molding apparatus may be configured such that each subsequent shot is prior to full cooling of the lens region formed in the previous shot. Such overmolding of a substantially warm prior-formed lens region achieves smooth substantially seamless blending of the adjacent regions together. Such seamless overmolding is highly beneficial in formation of LED lenses to facilitate accurate transmission of light therethrough.

Lens regions which have the texturing are of a molded thermoplastic elastomer such as suitable polymeric materials. While the entire lens can be of the same material, some versions of the lens may include regions of different polymeric materials. In some embodiments, lens regions which include outer lens surfaces may be of an acrylic. A wide variety of optical-grade acrylics can be used, and are available from various sources, including: Mitsubishi Rayon America, Inc.; Arkema Group; and Evonik Cyro LLC. Some optical-grade acrylics useful in this invention have an index of refraction of 1.49.

In certain embodiments, other lens regions may be of a second polymeric layer such as a liquid silicone resin (LSR). A wide variety of optical-grade LSRs can be used, and are available from various sources, such as: The Dow Chemical Company; Wacker Chemie AG; and Momentive Performance Materials Products. Some optical-grade LSR materials have an index of refraction of 1.41.

Figure 17:
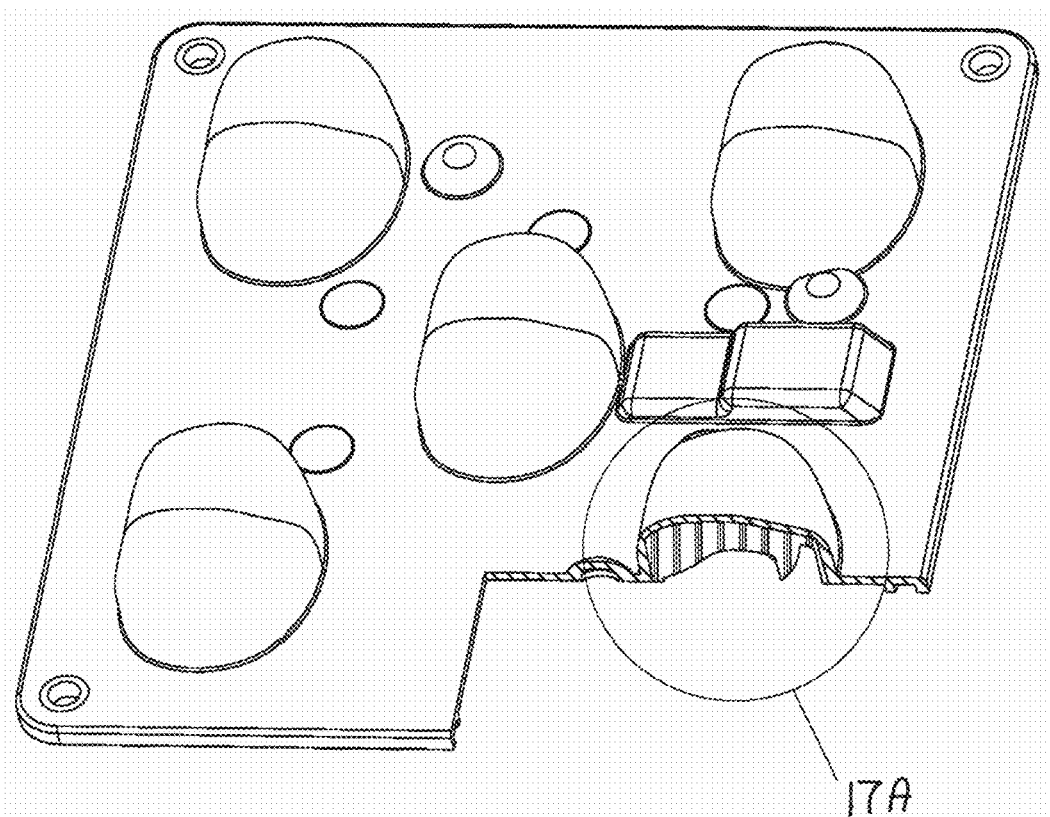
FIG. 17 is a perspective view of an optical member including a plurality of lenses according to the present invention.
Figure 17A:
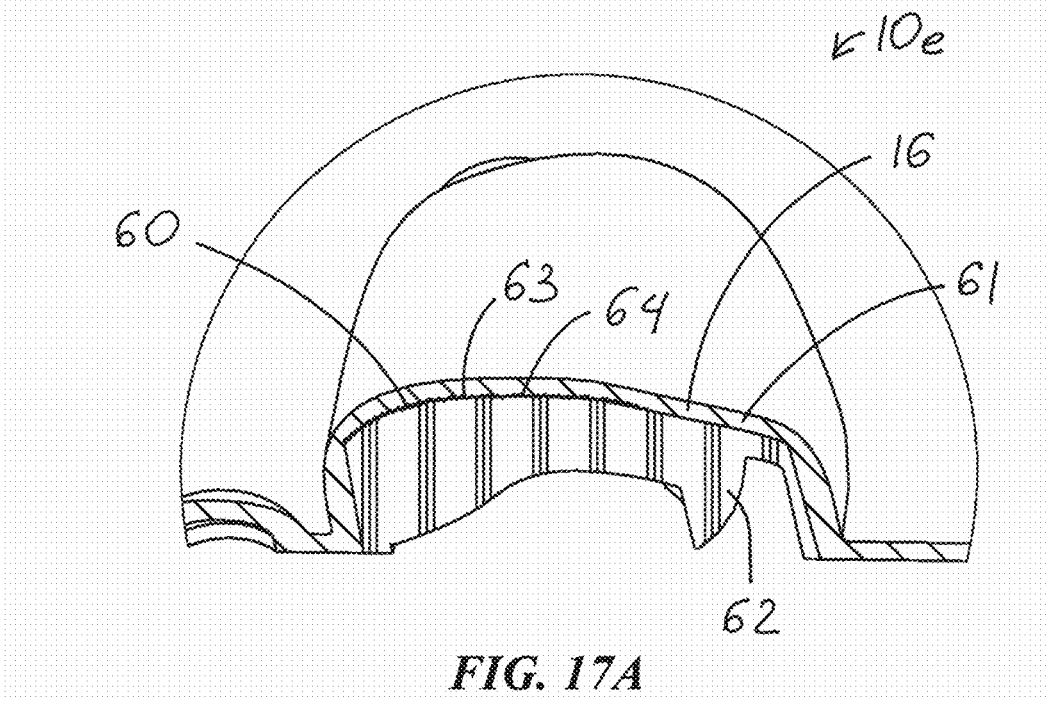
FIG. 17A is an enlarged fragment of the optical member of FIG. 17 showing a cross-section of one of the lenses.

FIGS. 17 and 17A show lens 10e which includes an interface 60 between first thermoplastic elastomer 61 and second thermoplastic elastomer 62 with different indices of refraction. In lens 10e shown in FIG. 17A, interface 60 has surface 63 having texturing 64 for diffusion of emitter light passing therethrough. FIG. 17A shows that surface 63 with texturing 64 is a light-receiving surface.

Interface 60 between first and second polymers 61 and 62 may be formed by first molding a lens region 16 which includes surface 63 having texturing 64. Lens region 16 may be molded by injecting thermoplastic elastomer 61 into a cavity defined by a shape-forming configuration with at least one area of the cavity configured for causing texturing. Such shape-forming configuration is configured to shape a thermoplastic elastomer into such thickness (see in FIG. 17A) with which the set elastomer retains the texturing. Interface 60 is then formed by overlaying textured surface 63 with second thermoplastic elastomer 62.

FIGS. 22-27 show light emitter 20 in the form of an LED package 23 which has a primary lens 24 over the at least one LED 22. In such embodiments, the inventive lens is a secondary lens placed over primary lens 24. Light emitter 20 may be of the type illustrated in FIGS. 24-26 which show LED package 23D with single LED 22 on a submount 26 and hemispheric primary lens 24D coaxially overmolded on submount 26 over LED 22.

Figure 22:
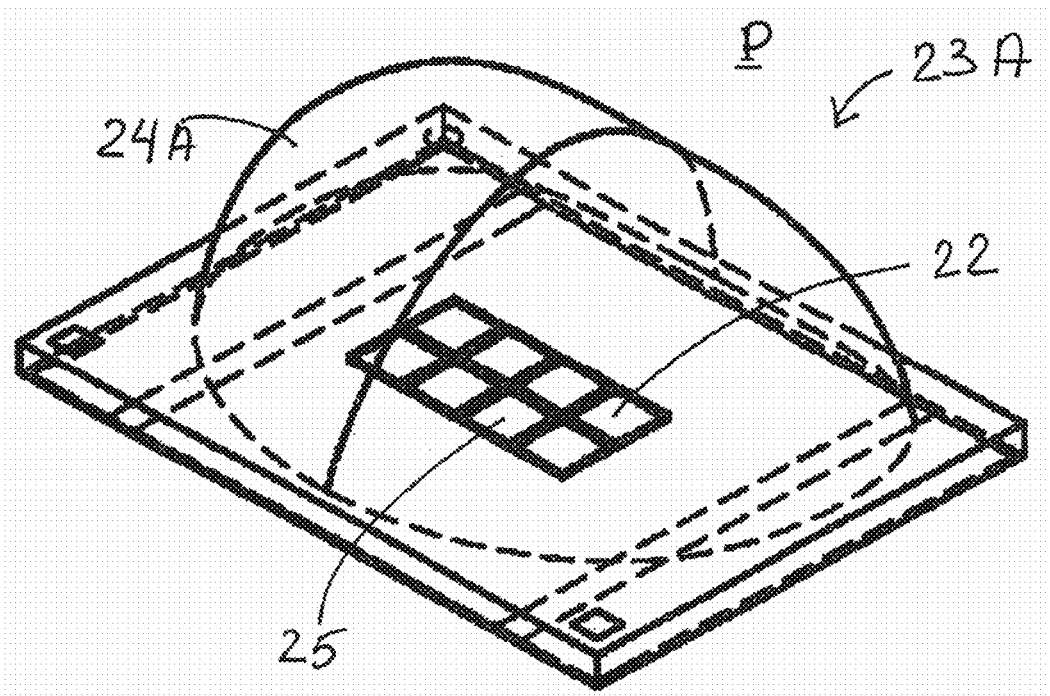
FIG. 22 is an enlarged perspective view of one example of an LED package including an array of eight LEDs on a submount and an asymmetric primary lens overmolded over the LED array.
Figure 23:
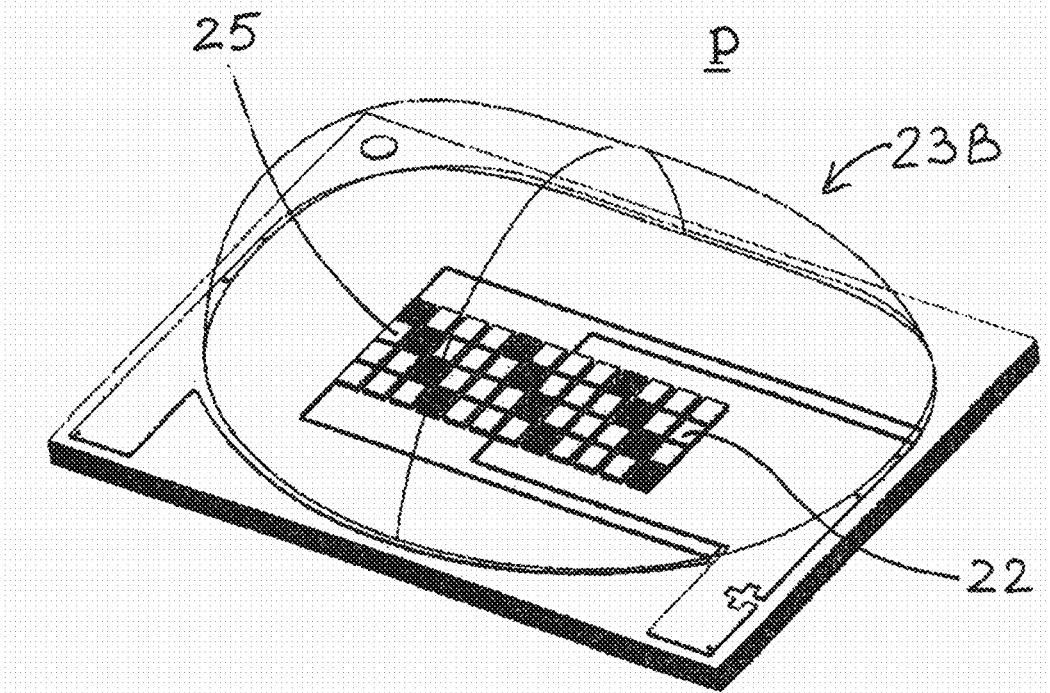
FIG. 23 is an enlarged perspective view of another example of an LED package including an array of forty-eight LEDs on a submount and an asymmetric primary lens overmolded over the LED array.
Figure 24:
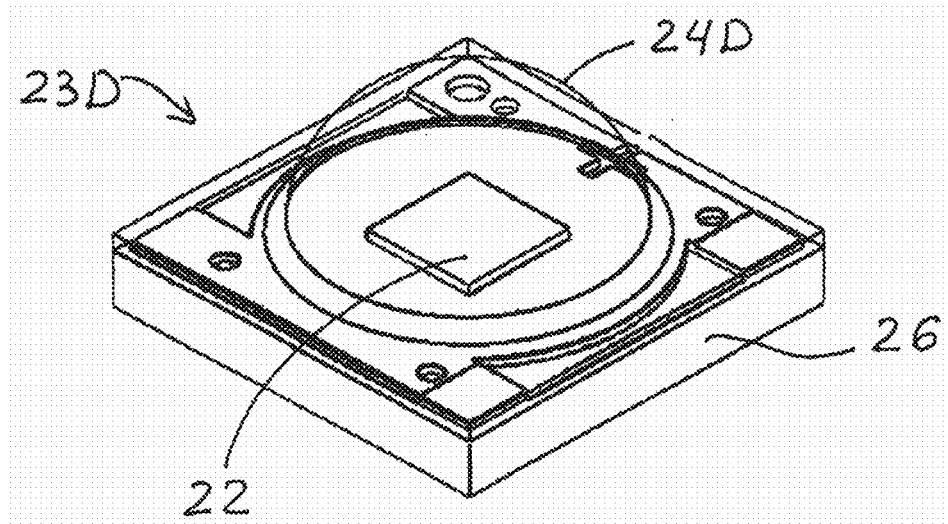
FIG. 24 is an enlarged perspective view of yet another example of an LED package which has a single LED on a submount with a hemispheric primary lens overmolded over the LED.
Figure 25:
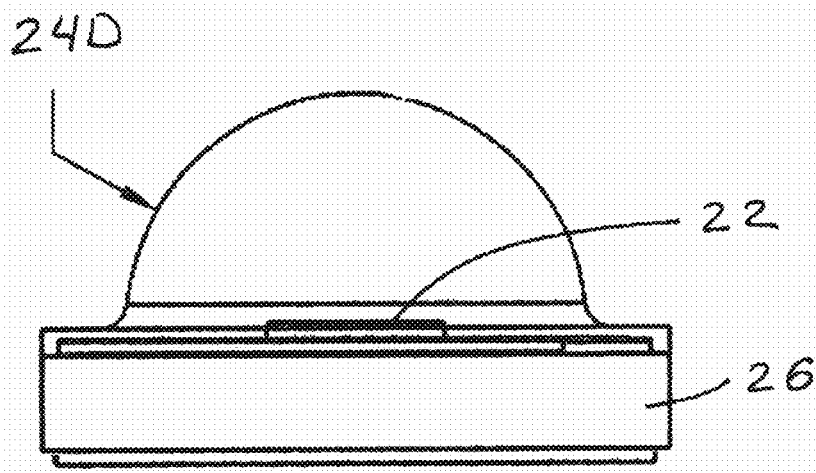
FIG. 25 is an enlarged side view of the LED package of FIG. 29.
Figure 26:
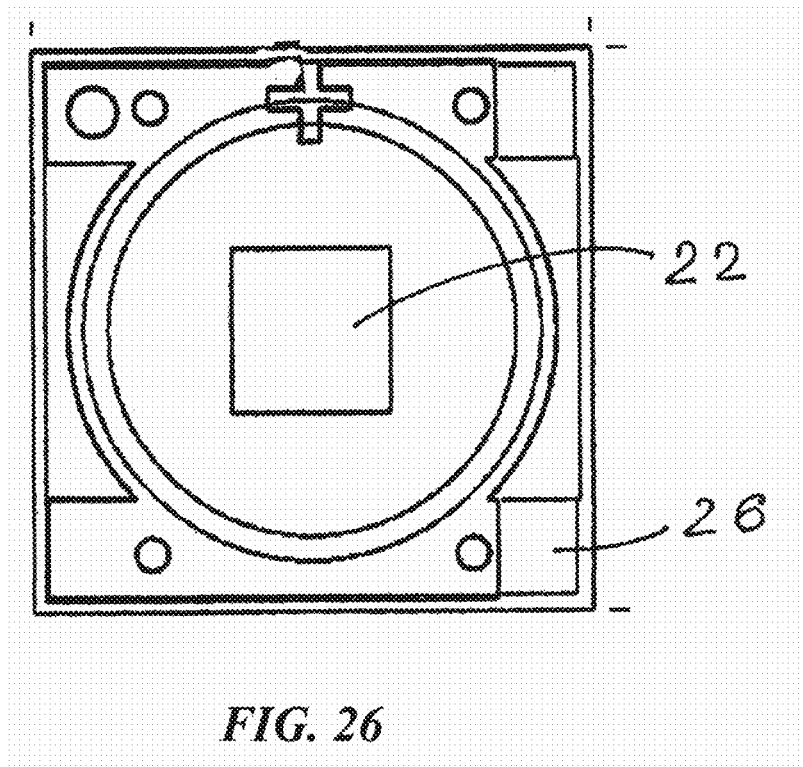
FIG. 26 is an enlarged top view of the LED package of FIG. 29.

FIGS. 22 and 23 illustrate exemplary LED packages 23A and 23B each including an array of LEDs 22 on an LED-populated area 25 which has an aspect ratio greater than 1, and primary lens 24 being overmolded on a submount 26 over LED-populated area 25. It is seen in FIG. 23 that the array may include LEDs 22 emitting different-wavelength light of different colors such as including red LEDs along with light green or other colors to achieve natural white light. Light emitters of the type as LED packages 23A and 23B are described in detail in application Ser. No. 13/441,558, filed on Apr. 6, 2012, and in application Ser. No. 13/441,620, filed on Apr. 6, 2012. The contents of both applications are incorporated herein by reference in their entirety.

Figure 27:
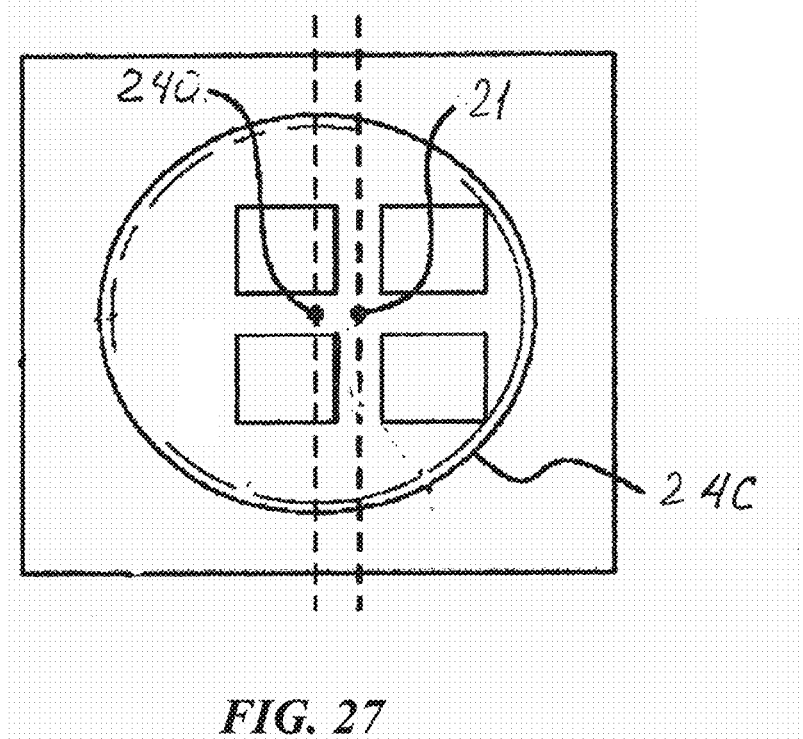
FIG. 27 is an enlarged top view of another exemplary LED package including an array of four LEDs on a submount and a hemispheric primary lens overmolded over the LED array such that the axis of the primary lens is offset from the axis of the LED array.

FIGS. 22, 23 and 27 illustrate versions of LED light emitter 20 configured to refract LED-emitted light in a forward direction (i.e., toward preferential side P). In each LED package 23A, 23B and 23C, each LED array defines an emitter axis. FIGS. 22 and 23 illustrate primary lens 24A configured to refract LED-emitted light forward. FIG. 27 shows hemispheric primary lens 24C having a centerline 240 offset from the emitter axis. It should be understood that for higher efficiency, LED emitter 20 may have 20 a primary lens having both its centerline offset from the emitter axis and also being shaped for refraction of LED-emitted light toward preferential side P. In FIGS. 22 and 23, primary lens 24A is shown as asymmetric.

While the principles of the invention have been shown and described in connection with specific embodiments, it is to be understood that such embodiments are by way of example and are not limiting.

The invention claimed is:

1. A method for manufacturing a lens for distribution of light from a light emitter, the method comprising the steps of:
   providing an injection-molding cavity defined by a shape-forming configuration with a texturing in at least one area of the cavity;
   injecting a thermoplastic elastomer into the cavity shaping a first region of the lens of the elastomer;
   cooling and setting the first region prior to sinking of the elastomer such that the first region retains the texturing of the shape-forming configuration forming a textured surface portion of the lens; and
   injection molding one or more additional regions of the lens away from the textured surface portion of the lens.

2. The method of claim 1 further comprising forming one of the additional regions onto the first region while the first region is still cooling and setting.

3. The method of claim 1 further including a step of overlaying the textured surface portion with a second thermoplastic elastomer of one of the additional regions, thus forming an interface between two materials with different indices of refraction.

4. The method of claim 1 further comprising forming the first region and the one or more additional regions with the lens comprising thick and thin wall portions between inner and outer lens surfaces, the thick wall portion(s) being at least twice as thick as the thin wall portion(s), at least one of the inner and outer surfaces having the textured surface portion for diffusion of emitter light passing therethrough.

5. The method of claim 4 wherein the step of forming the one or more additional regions is by over-molding the first region at surface portion(s) other than the textured surface portion.

6. The method of claim 5 wherein the textured surface portion is on an inner surface of the lens receiving light from the light emitter.

7. The method of claim 6 wherein the textured surface portion defines an innermost region of an inner cavity receiving light from the light emitter.

8. The method of claim 4 wherein forming one of the additional regions comprises over-molding the first region by an injection-molding shot prior to full cooling of the first region.

9. The method of claim 1 wherein each of the one or more additional regions is formed by an injection-molding shot that occurs prior to full cooling of the lens region formed in the previous injection-molding shot.

10. The method of claim 1 further including a step of forming a second textured surface portion on one of the additional regions by:
   injecting the thermoplastic elastomer into the cavity which retains the first region and is defined by a shape-forming configuration with a second texturing in a second area of the cavity;
   cooling and setting the additional region prior to sinking of the elastomer such that the second texturing remains on the second textured surface portion of the lens.

11. The method of claim 10 wherein the additional region with the second textured surface portion is a last region that is formed on the lens.

12. The method of claim 10 wherein the second textured surface portion is on a light-output surface of the lens.

13. The method of claim 12 wherein the second textured surface portion is a last-formed region of the lens.

14. The method of claim 10 wherein the second textured surface portion is on a light-entrance surface of the lens.

15. The method of claim 14 wherein the second textured inner surface portion defines an innermost region of an inner cavity receiving light from the light emitter.

16. The method of claim 10 further including a step of overlaying the second textured surface portion with a second thermoplastic elastomer, thus forming an interface between two materials with different indices of refraction.

17. A method for manufacturing a lens for distribution of light from a light emitter, the method comprising the steps of:
   injection molding a first region comprising a first inner surface and a first outer surface, the first region comprising a thickness measured between the first inner surface and the first outer surface;
   sequentially injection molding one or more additional regions over the first region with each of the additional regions comprising an additional inner surface and an additional outer surface;
   forming texturing on one or more of the surfaces of the first region and the additional regions;
   the first inner surface forming an overall inner surface of the lens and the additional outer surface of the last one or more additional regions forming an overall outer surface of the lens with the lens comprising an overall thickness measured between the overall inner and outer surfaces; and
   each of the first region and the one or more additional regions comprising a thickness that is less than the overall thickness such that the texturing on the one or more surfaces is retained prior to sinking of the region during cooling and setting;
   wherein the texturing is positioned at an area of the lens with the overall thickness being thin and away from areas with the overall thickness being thick.

18. A method for manufacturing a lens for distribution of light from a light emitter, the method comprising the steps of:
   injection molding an inner region with a textured inner surface that forms a lens inner surface and defining an inner cavity that receives the light from the light emitter;
   injection molding one or more intermediate regions onto the inner region in an overlapping arrangement;
   injection molding an outer region onto an outer one of the one or more intermediate regions, the outer region comprising an outer surface that receives light from the inner region and emits the light outward away from the lens; and
   the inner region thinner than an overall thickness of the lens measured between the inner and outer surfaces for the texturing on the inner surface to be retained prior to sinking of the inner region during cooling and setting;
   the textured inner surface is positioned along a thin wall portion of the lens and away from thick wall portions of the lens.

* * * * *